United States Patent [19]

Riede

[11] 4,390,424
[45] * Jun. 28, 1983

[54] DEVICE FOR DIFFUSING MATTER BETWEEN TWO FLUIDS VIA SEMI-PERMEABLE DIAPHRAGMS

[75] Inventor: Gerhard Riede, Vellinge, Sweden

[73] Assignee: Gambro AG, Switzerland

[*] Notice: The portion of the term of this patent subsequent to Sep. 23, 1997, has been disclaimed.

[21] Appl. No.: 130,456

[22] Filed: Mar. 14, 1980

Related U.S. Application Data

[62] Division of Ser. No. 716,479, Aug. 23, 1976, Pat. No. 4,224,159.

[30] Foreign Application Priority Data

Sep. 11, 1975 [SE] Sweden .............................. 7510097

[51] Int. Cl.³ ............................................. B01D 31/00
[52] U.S. Cl. ................................... 210/232; 210/321.3
[58] Field of Search ................. 210/232, 321.1, 321.2, 210/321.3, 321.5

[56] References Cited

U.S. PATENT DOCUMENTS

| | | | |
|---|---|---|---|
| 3,333,706 | 8/1967 | Isreeli | 210/321.1 |
| 3,730,350 | 5/1973 | Hoeltzenbein | 210/321.3 |
| 3,834,544 | 9/1974 | Tyson, Jr. et al. | 210/321.3 |
| 3,907,687 | 9/1975 | Hoeltzenbein | 210/321.3 |
| 4,016,081 | 4/1977 | Martinez et al. | 210/321.3 |
| 4,039,455 | 8/1977 | Bardin et al. | 210/321 B |
| 4,224,159 | 9/1980 | Riede | 210/232 |

FOREIGN PATENT DOCUMENTS

| | | | |
|---|---|---|---|
| 2031730 | 11/1970 | France | 210/321.3 |
| 2082708 | 10/1971 | France | 210/232 |
| 2294731 | 7/1976 | France | 210/321.3 |

Primary Examiner—Frank A. Spear, Jr.
Attorney, Agent, or Firm—Lerner, David, Littenberg, Krumholz & Mentlik

[57] ABSTRACT

Apparatus for diffusing matter between two fluids is disclosed, including a stacked configuration of alternating spacing plates and pairs of semi-permeable membranes, the spacing plates including flow passages for each of the fluids so that they can be passed between the pairs of semi-permeable membranes and between the spacing plates and the pairs of membranes, respectively, first and second clamping plates, and means for clamping the first clamping plate to the second clamping plate with the stacked configuration pressed therebetween. Specifically, in the improvements of this apparatus which is disclosed, the first clamping plate includes a pair of laterally extending side walls including first and second side wall sections and an intermediate side wall section between them, where the second side wall section is displaced outwardly with respect to the first side wall section and the intermediate side wall section obliquely connects the first and second side wall sections so that at least a portion of the second clamping plate is disposed within a second side wall section of the laterally extending side walls of the first clamping plate when the two clamping plates are clamped together, and apertures in the laterally extending side walls located in the intermediate side wall section so that the manufacture of the first clamping plate by extrusion processes is substantially simplified, and the second clamping plate includes corresponding outwardly extending locking members to engage the apertures in the side walls of the first clamping plate so as to contain the stacked configuration under increased pressure therebetween.

4 Claims, 13 Drawing Figures

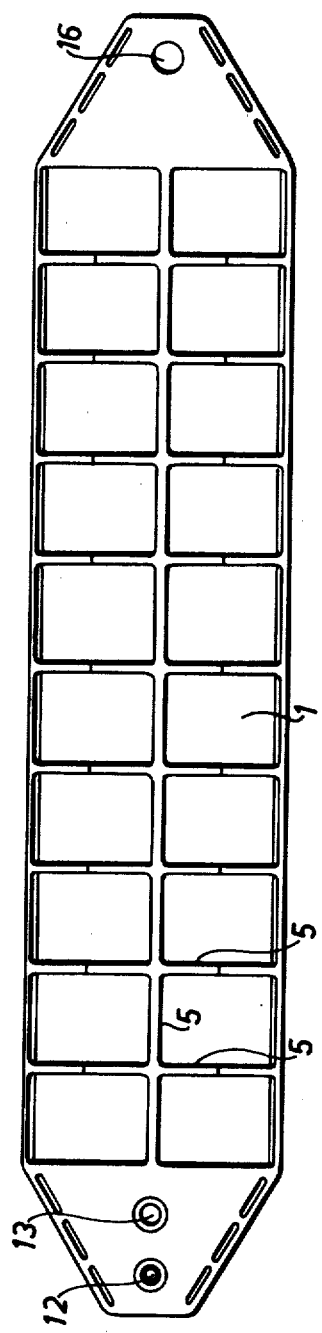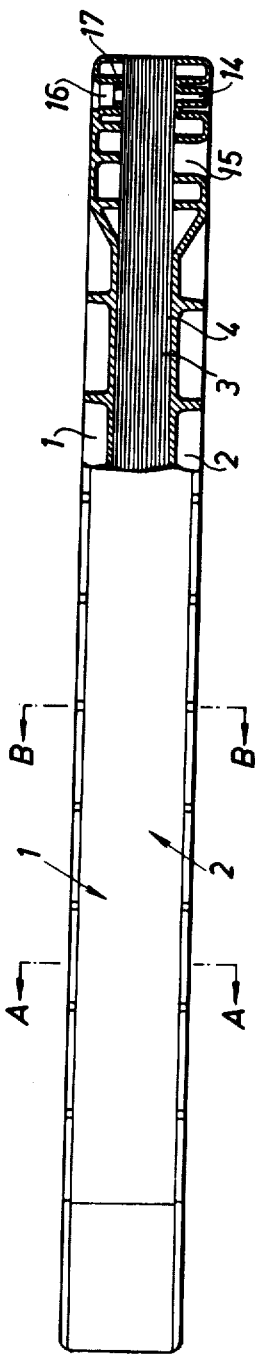

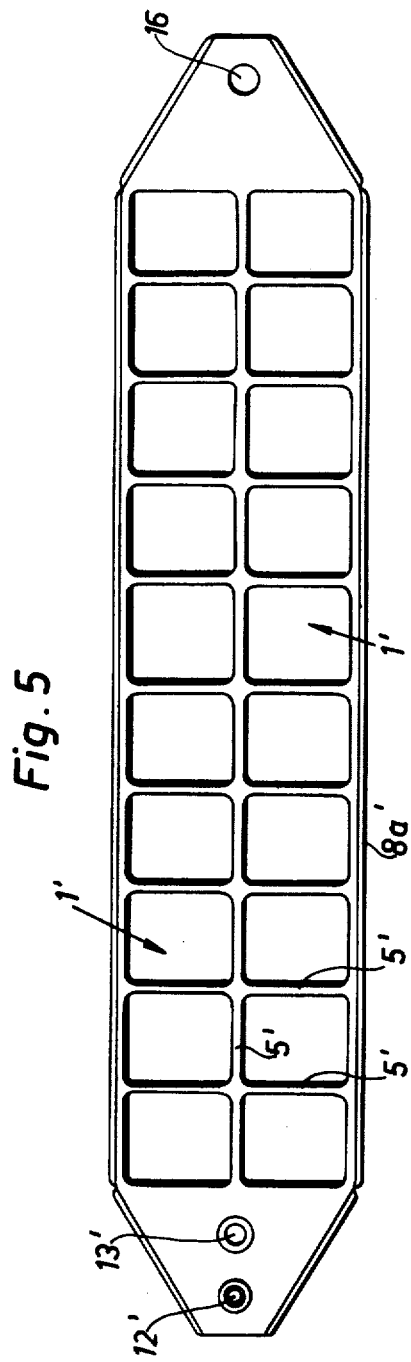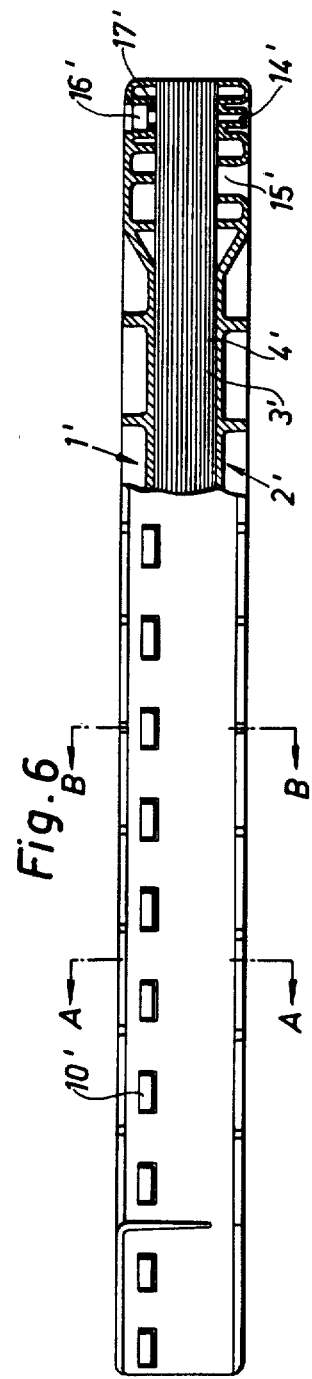

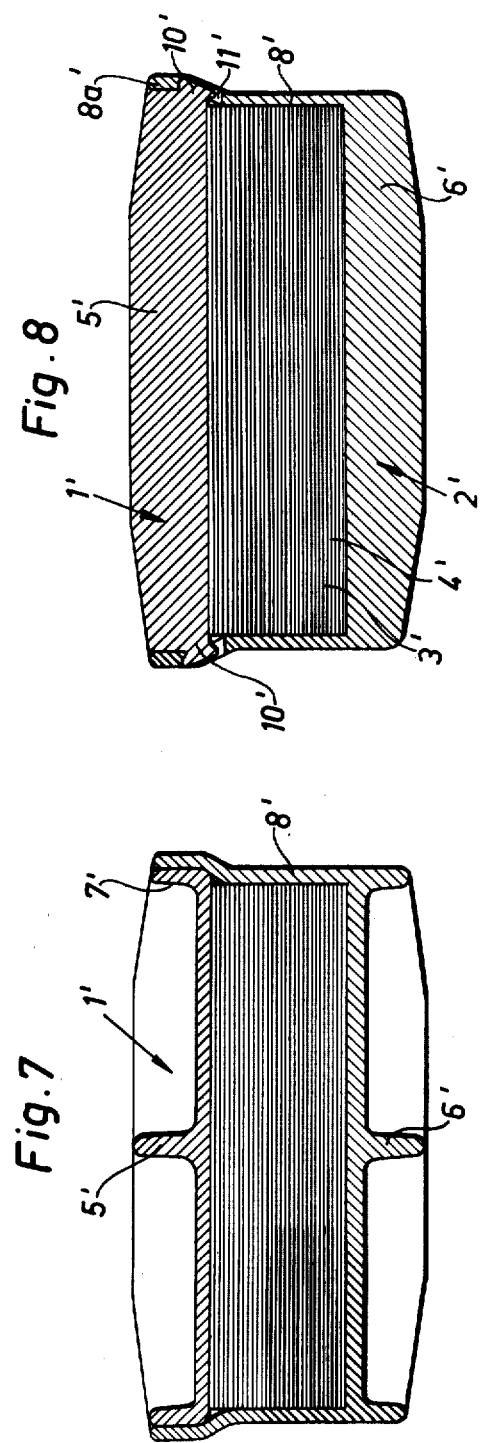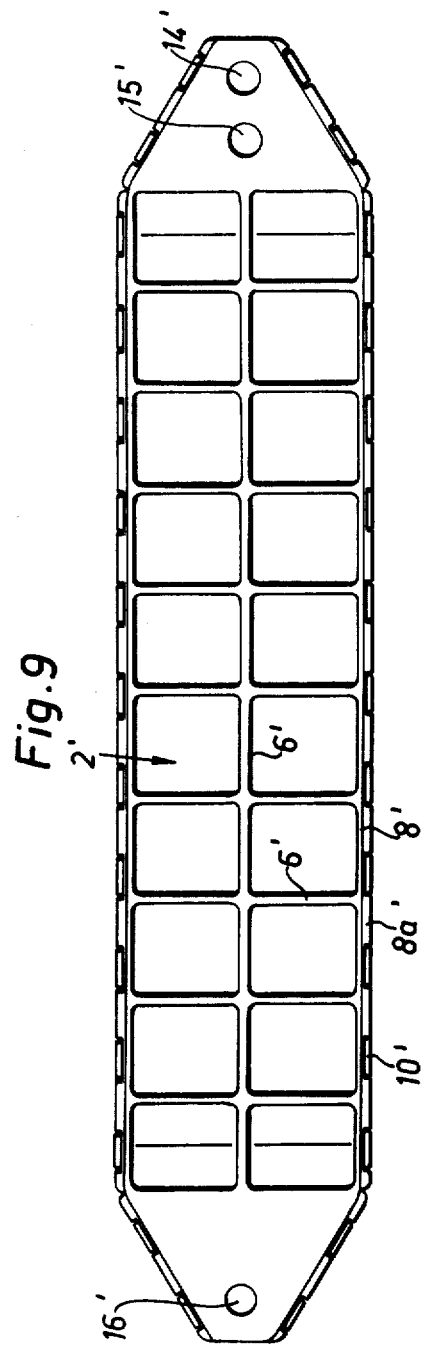

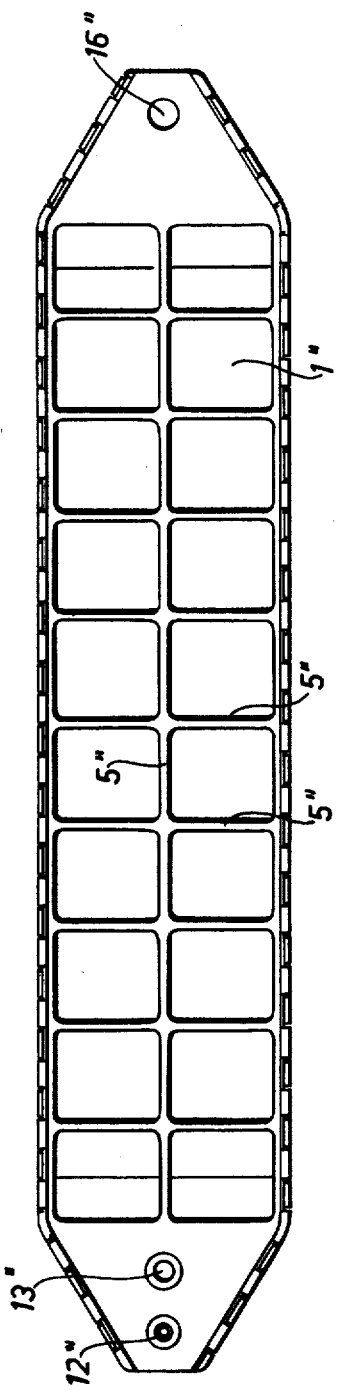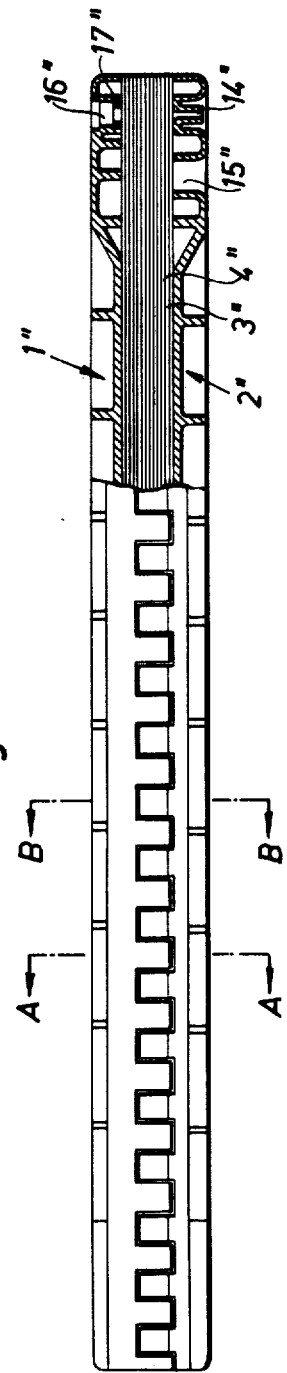

DEVICE FOR DIFFUSING MATTER BETWEEN TWO FLUIDS VIA SEMI-PERMEABLE DIAPHRAGMS

This is a division of application Ser. No. 716,479, filed Aug. 23, 1976, now U.S. Pat. No. 4,224,159.

FIELD OF THE INVENTION

The present invention relates to apparatus for diffusing matter between two fluids utilizing semi-permeable diaphragms or membranes which are arranged in pairs between spacing plates in a stacked configuration including at least two spacing plates and at least one pair of diaphragms. More particularly, the present invention relates to such stacked configurations of spacing plates and pairs of semi-permeable membranes wherein each plate comprises through flow passages for each of the respective fluids, these passages connected to the inlet and outlet therefor, so that one of the fluids can be led between the pairs of diaphragms and the other fluid can be led outside the diaphragms, that is between the diaphragms and the spacing plates, and wherein the entire stacked configuration is clamped between a bottom portion and a top portion.

BACKGROUND OF THE INVENTION

The use of stacked configurations of alternating spacing plates and pairs of semi-permeable membranes for diffusing matter between two fluids has been known for many years. Such apparatus are thus disclosed in a number of patents, including Swedish Pat. Nos. 218,441 (U.S. Pat., No. 3,411,630), 301,029 (U.S. Pat. No. 3,501,011), 325, 370 (U.S. Pat. No. 3,511,381), 314,167 (U.S. Pat. No. 3,516,548), and 342,144 (U.S. Pat. No. 3,734,298). In U.S. Pat. No. 3,734,298, for example, such a device for use in dialysis is demonstrated. The device in this patent thus includes means for pressing the alternating spacer plates and pairs of membranes together between a pair of clamping plates utilizing clamping rails extending along and engaging grooves provided along the sides of both clamping plates. As shown in that patent, the clamping plates thus are provided at either end of the stacked configuration, and do not extend laterally below any of the spacing plates and/or pairs of membranes, and the clamping rails shown therein (see FIG. 8) must then be attached by engaging the grooves on either end of the clamping plates. A problem in all of these constructions has been to provide a pressure which is evenly distributed over the entire working surface, as well as providing a suitable pressure in the areas around the through flow passages in order to provide an adequate seal at those points. If this is not obtained, there is a risk that an exterior leakage will occur, and/or a leakage between the two fluids, which is entirely unacceptable.

Reference can also be made to a number of other patents which attempt to demonstrate such diffusion apparatus which include alternating stacks of spacing plates and pairs of semi-permeable membranes, each of which suffers from the deficiencies disclosed above. These include U.S. Pat. Nos. 3,494,469; 3,219,573; 3,051,316; and 3,219,572.

SUMMARY OF THE INVENTION

In accordance with the present invention, these and other problems have been solved in a simple and expedient manner. In particular, the prior apparatus for diffusing matter between two fluids which have employed a plurality of spacing plates, a plurality of pairs of semi-permeable membranes, wherein the spacing plates include flow passages for each of these fluids so that when the spacing plates and the pairs of semi-permeable membranes are arranged in a stacked, alternating configuration, one of the fluids may be passed between the pairs of semi-permeable membranes while the other fluid may be passed between the spacing plates and the pairs of semi-permeable membranes, a first clamping plate, a second clamping plate, and means for clamping the first and second clamping plates together with the stacked configuration pressed therebetween, have now been substantially improved upon. In particular, in accordance with this invention, the first clamping plate includes a pair of laterally extending side walls forming that clamping plate into a cup-shaped configuration, and means for engaging the side walls of the first clamping plate to the second clamping plate at a plurality of locations around the periphery of the apparatus are provided, in order to contain the stacked configuration therebetween with increased pressure at those locations around the flow passages in the spacing plates, again so that uniform pressure can be maintained throughout the entire working surface of the spacing plates, including at those locations.

In a preferred embodiment to the present invention, the laterally extending side walls of the first clamping plate extend for at least one-half of the lateral surface area of the stacked configuration of spacing plates and alternating pairs of semi-permeable membranes.

In another embodiment of the present invention, both the first and second clamping plates include laterally extending side walls, so that both the first and second clamping plates have a cup-shaped configuration. Preferably, both of the first and second clamping plates include means integral with their side walls so that they may engage each other around the periphery of the apparatus.

In another embodiment of the present invention, locking means are provided in the case where both the first and second clamping plates include laterally extending side walls, to permit the engagement of these two clamping plates together to provide the increased pressure described above.

In a highly preferred embodiment of the present invention, where both the first and second clamping plates include laterally extending side walls, they are provided with hook-shaped locking members integral with the side walls so that the first clamping plate can telescopically grip the second clamping plate at these locking members. Preferably, the hook-shaped locking members associated with the first clamping plate will include an outer flange extending substantially around the entire periphery of that portion, while the hook-shaped locking means associated with the second clamping plate will include a plurality of hook means again substantially around the entire periphery of the second clamping plate, and including a plurality of apertures on the upper surface thereof to assist in the manufacture of these clamping plates.

In yet another highly preferred embodiment of the present invention, the overall apparatus will include an essentially rectangular shape including tapering ends, and the flow passages will be associated with the tapering ends, preferably so that the distance from each of the flow passages to the laterally-extending side walls will be substantially reduced as compared to a purely rectangular configuration.

In yet another embodiment of the present invention, both the laterally projecting side walls of the first and second clamping plates includes a plurality of individual flanges so that extremely high pressures can be developed within the apparatus. In this manner a large number of individual connections are maintained around the entire periphery of the apparatus.

In particular, the apparatus of the present invention can be utilized for purifying blood, that is as a so-called artificial kidney. Persons skilled in this art will realize, however, that the construction disclosed in this application may be used for many other purposes. For instance, it can be utilized in order to oxygenate blood. In that case, one of the above-mentioned fluids will be blood, whereas the other fluid will consist of oxygen or a oxygen mixture. Alternatively, the device of this invention can be used for transferring matter from one gas to another. It is therefore apparent that by "fluid" is meant both gases and liquids in this application. However, as the device according to this invention is primarily intended for purifying blood, it will be described in the following detailed description in connection with such a use.

The invention will be described in more detail in the following detailed description, with particular reference to the accompanying drawings which show as examples three preferred embodiments of the apparatus in accordance with the present invention. All of these embodiments are thus meant to be utilized in the first instance as artificial kidneys.

BRIEF DESCRIPTION OF THE DRAWINGS

FIG. 1 shows a top perspective view of the top clamping plate of an artificial kidney in accordance with the present invention.

FIG. 2 shows a side, partially sectional, perspective view of the artificial kidney of FIG. 1.

FIG. 5 shows a top, perspective view of the clamping plate of another artificial kidney in accordance with the present invention.

FIG. 6 shows a side, partially sectional, perspective view of the artificial kidney shown in FIG. 5.

FIG. 7 shows a side, sectional view of the artificial kidney of FIG. 6 taken along section A—A of FIG. 6.

FIG. 8 shows a side, sectional perspective view of the artificial kidney of FIG. 6 taken along section B—B of FIG. 6.

FIG. 9 shows a bottom, perspective view of the bottom clamping plate of the artificial kidney of FIG. 5.

FIG. 10 shows a top, perspective view of the top clamping plate of another artificial kidney in accordance with the present invention.

FIG. 11 shows a side, partially sectional, perspective view of the artificial kidney of FIG. 10.

DETAILED DESCRIPTION

Figure 3:
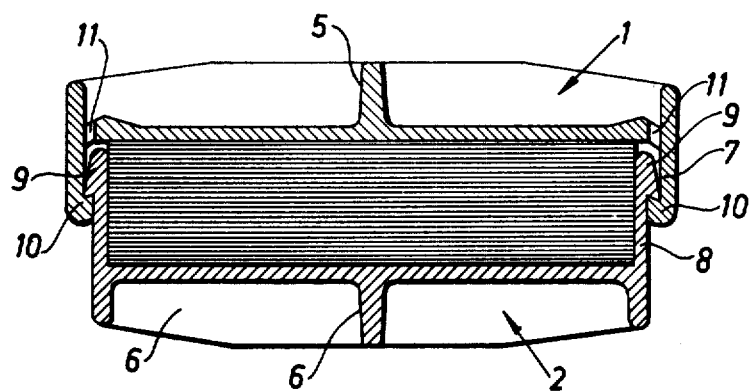
FIG. 3 shows a side, sectional view of the artificial kidney of FIG. 2, taken along section A—A of FIG. 2.
Figure 4:
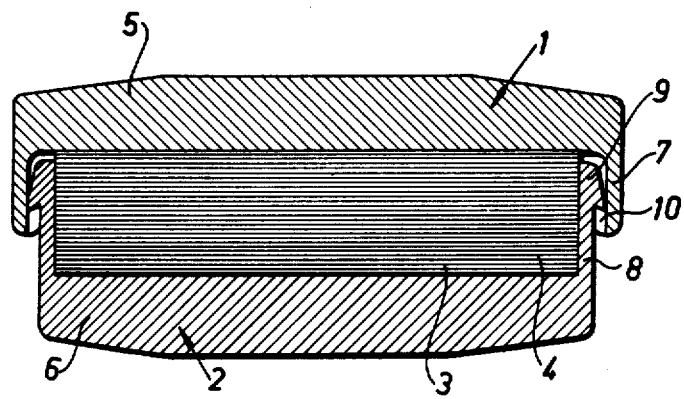
FIG. 4 shows a side, sectional view of the artificial kidney of FIG. 2, taken along Section B—B of FIG. 2.

The preferrerd embodiments of the present invention will now be reviewed in more detail with reference to these figures, in which like numerals refer to like portions thereof. The artificial kidney shown in FIGS. 1 through 4 includes a top portion or clamping plate 1 and a bottom portion or clamping plate 2, as well as an intermediate package or stacked configuration of spacing plates 3 therebetween. Between each pair of adjacent spacing plates 3, are provided a pair of diaphragms or semi-permeable membranes 4. In FIGS. 2 through 4 these pairs of diaphragms are represented by the intersecting line between the spacing plates 3 shown therein, in order that the separate figures will not have to be unnecessarily enlarged and detailed. In this example, both the top clamping plate and the bottom clamping plate are cup-shaped, that is include laterally extending side walls 7 and 8, respectively, and are built from a framework of flanges 5 and 6, respectively. The laterally extending side walls 7 and 8 preferably extend laterally for a distance of at least half of the area of the stacked configuration of alternating spacing plates and pairs of diaphragms. As can best be seen in FIGS. 3 and 4, the top and bottom clamping plates are held together by hook-shaped locking members 9 and 10. Thus, in connection with the bottom clamping plate 2, its laterally extending side wall 8 includes an exterior flange running continuously essentially around the entire periphery of the bottom clamping plate 2 forming hook-shaped locking member 9 thereabout. The top clamping plate 1, however, includes a plurality of separate hooks 10, as shown in FIG. 3, mounted so as to face inwardly, and adapted to engage flange 9, which extends outwardly from its laterally extending side wall 8. Thus, while the laterally extending side wall 7 of the upper clamping plate 1 extends substantially continuously around the entire periphery of the top clamping plate 1, it includes a plurality of hook members 10 extending periodically inwardly from side wall 7. Opposite each hook member 10 thus provided on the upper clamping plate 1 an aperture 11 is provided. This permits the top clamping member 1 to be manufactured by extrusion processes in a simple extrusion tool divided into two parts, and being made without movable cores.

The blood may then be admitted through inlet opening 12 in the top clamping plate 1, while the purifying liquid is admitted through opening 13 in top clamping plate 1. The method for achieving this result may be more fully understood in connection with the patents mentioned above, including U.S. Pat. Nos. 3,411,630 and 3,734,298, those portions of which are therefore incorporated herein by reference thereto. In a similar manner, the blood and the purifying liquid are removed through openings 14 and 15 in the lower clamping plate 2, respectively. Finally, an aperture 16 in the top clamping plate 1 is provided to facilitate mounting of the artificial kidney of this invention, and this aperture is in turn plugged with the aid of a plug (not shown) and a gasket 17.

When this artificial kidney as shown in FIGS. 1 through 4 is finally assembled, it is, as noted above, essential that an even pressure be applied around the entire periphery of the kidney, and over the entire active surface, as well as around openings 12, 13, 14 and 15, respectively. If this does not occur, there may be leaks either from the kidney itself, or between the blood and the purifying liquid therein. Practical tests and experiments have demonstrated that the hook-shaped locking members can provide this desired pressure with the desired even distribution of pressure throughout. This pressure distribution is further improved as a result of the tapering shape of the kidney as shown in FIG. 1. In this manner, this shape provides a small distance between openings 12 through 15 and each of the nearest locking members to these openings are compared to that distance as it would occur if the kidney itself were strictly rectangular in configuration, as has been the case in the past.

Referring now to FIGS. 5 through 9, another embodiment of the artificial kidney of the present invention is shown therein. The overall configuration of this apparatus thus corresponds, at least in principal, with that of FIGS. 1 through 4. Consequently, the same numerals have been utilized, although a ' is employed in connection with each numeral in this embodiment. One primary difference with this embodiment lies in the top clamping plate 1'. That is, in this case, the top clamping plate 1' is shaped as a plate, that is it does not include any laterally extending side walls. The top clamping 1' thus includes a plurality of hook-shaped locking members 10' extending outwardly therefrom at locations substantially around the entire periphery thereof. The bottom clamping plate 2' thus includes laterally extending side wall 8', and a plurality of apertures 11' corresponding with the locking members 10' on the upper clamping plate 1', and adapted to engage these hook shaped locking members 10'. Thus, the bottom clamping plate 2' is cup-shaped and has an upper flaring marginal portion 8a'. Again, the construction and function of the kidney itself is essentially the same as that of the embodiment shown in FIGS. 1 through 4. It should finally be noted that the top clamping plate 1' includes an upwardly laterally extending wall 7', which again does not extend downwardly laterally with respect to the stacked configuration of spacing plates 3 and pairs of semi-permeable membranes 4.

Figure 12:
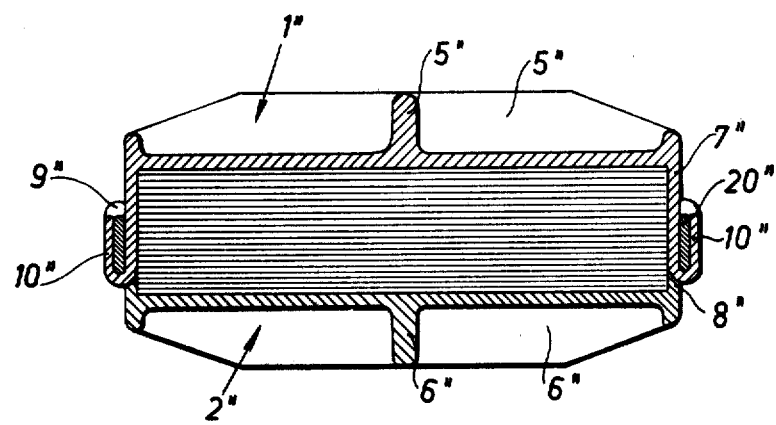
FIG. 12 shows a side, sectional view of the artificial kidney of FIG. 11, taken along section A—A of FIG. 11.
Figure 13:
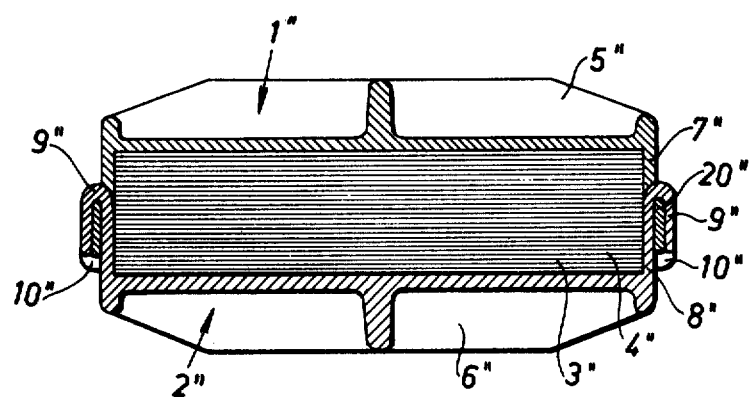
FIG. 13 shows a side, sectional view of the artificial kidney of FIG. 11 taken along section B—B of FIG. 11.

The embodiment shown in FIGS. 10 through 13 is again essentially the same as that shown in FIGS. 1 through 4. The same reference numerals have therefore again been utilized, although the addition of a " is employed in this case. Again, the essential difference in this embodiment lies in the locking members 9" and 10". In this embodiment, both the laterally depending side walls 7" and 8" of the top clamping plate 1" and bottom clamping plate 2", respectively, include a plurality of hooks, comprising inversely U-shaped hook members 10" and 9", respectively, which may be aligned with each other in the manner shown in FIGS. 12 and 13. As a result, they form a groove, so that rail members 20" may be inserted in that groove to lock the top and bottom clamping portions together. In all other respects, this construction is essentially the same as the constructions described above with respect to FIGS. 1 through 4, and therefore it is not necessary to describe the additional individual details of this embodiment.

The present invention is, of course, not limited to the three embodiments described above, but may be varied within the scope of the following claims. Thus, the shape of the details forming part of the construction may be varied essentially without exceeding the scope of this invention.

What is claimed is:

1. In an apparatus for diffusing matter between two fluids, said apparatus comprising a plurality of spacing plates; a plurality of pairs of semi-permeable membranes, said spacing plates including flow passages for each of said fluids so that, when said spacing plates and said pairs of semi-permeable membranes are arranged in a stacked configuration, one of said fluids may be passed between said membranes of said pairs of semi-permeable membranes and said other fluid may be passed between said spacing plates and said pairs of semi-permeable membranes; a first clamping plate; a second clamping plate; and means for clamping said first clamping plate to said second clamping plate with said stacked configuration pressed therebetween, the improvement which comprises: (1) said first clamping plate including (a) a pair of laterally extending side walls including a first side wall section, a second side wall section, and an intermediate side wall section therebetween, wherein said second side wall section is displaced outwardly with respect to said first side wall section and wherein said intermediate side wall section obliquely connects said first side wall section and said second side wall section so that at least a portion of said second clamping plate is disposed within said second side wall sections of said laterally extending side walls of said first clamping plate when said first and second clamping plates are clamped together, and (b) a plurality of apertures in said laterally extending side walls, wherein said plurality of apertures are located in said intermediate side wall section of said laterally extending side walls of said first clamping plate, whereby the manufacture of said first clamping plate by extrusion processes is substantially simplified; and (2) said second clamping plate including a plurality of outwardly extending locking members for engaging said apertures of said side walls of said first clamping plate to said second clamping plate at a plurality of locations around the periphery of said apparatus in order to contain said stacked configuration under increased pressure therebetween.

2. An apparatus according to claim 1, wherein said locking members are integral with said second clamping plate.

3. In an apparatus for diffusing matter between two fluids, said apparatus comprising a plurality of spacing plates; a plurality of pairs of semi-permeable membranes, said spacing plates including flow passages for each of said fluids so that, when said spacing plates and said pairs of semi-permeable membranes are arranged in a stacked configuration, one of said fluids may be passed between said membranes of said pairs of semi-permeable membranes and said other fluid may be passed between said spacing plates and said pairs of semi-permeable membranes; a first clamping plate; a second clamping plate; and means for clamping said first clamping plate to said second clamping plate with said stacked configuration pressed therebetween, the improvement which comprises: (1) said first clamping plate including (a) a pair of laterally extending side walls, wherein at least a portion of each of said side walls is displaced outwardly from said second clamping plate so that at least a portion of said second clamping plate is disposed within said portion of said first clamping plate when said first and second clamping plates are clamped together, (b) a plurality of hook-shaped locking members projecting inwardly from said laterally extending side walls of said first clamping plate, and (c) a plurality of apertures at locations corresponding to said plurality of hook-shaped members, whereby the manufacture of said first clamping plate by extrusion processes is substantially simplified; and (2) said second clamping plate including a substantially continuous flange member extending outwardly from said second clamping plate for engaging said hook-shaped members of said side walls of said first clamping plate to said second clamping plate at a plurality of locations around the periphery of said apparatus in order to contain said stacked configuration under increased pressure therebetween.

4. An apparatus according to claim 3, wherein said laterally extending side walls and the hook-shaped locking members projecting therefrom are integral with said first clamping plate and wherein said flange member is integral with said second clamping plate.

* * * * *